United States Patent
Mody et al.

(10) Patent No.: US 11,611,764 B2
(45) Date of Patent: *Mar. 21, 2023

(54) METHOD AND APPARATUS OF HEVC DE-BLOCKING FILTER

(71) Applicant: TEXAS INSTRUMENTS INCORPORATED, Dallas, TX (US)

(72) Inventors: Mihir Narendra Mody, Bengalaru (IN); Niraj Nandan, Bengaluru (IN); Hideo Tamama, San Diego, CA (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 17/330,840

(22) Filed: May 26, 2021

(65) Prior Publication Data
US 2021/0281862 A1 Sep. 9, 2021

Related U.S. Application Data

(63) Continuation of application No. 16/564,871, filed on Sep. 9, 2019, now Pat. No. 11,070,819, which is a continuation of application No. 15/853,474, filed on Dec. 22, 2017, now Pat. No. 10,455,238, which is a
(Continued)

(51) Int. Cl.
| | |
|---|---|
| *H04N 19/176* | (2014.01) |
| *H04N 19/14* | (2014.01) |
| *H04N 19/82* | (2014.01) |
| *H04N 19/86* | (2014.01) |

(Continued)

(52) U.S. Cl.
CPC ........ *H04N 19/176* (2014.11); *H04N 19/117* (2014.11); *H04N 19/14* (2014.11); *H04N 19/82* (2014.11); *H04N 19/86* (2014.11); *H04N 19/186* (2014.11)

(58) Field of Classification Search
CPC .............................. H04N 19/14; H04N 19/82
See application file for complete search history.

(56) References Cited

U.S. PATENT DOCUMENTS

| | | |
|---|---|---|
| 9,854,252 B2 | 12/2017 | Mody et al. |
| 2006/0165181 A1 | 7/2006 | Kwan et al. |
| (Continued) | | |

*Primary Examiner* — Jerry T Jean Baptiste
(74) *Attorney, Agent, or Firm* — Carl G. Peterson; Frank D. Cimino

(57) ABSTRACT

A method of de-blocking filtering a processed video is provided. The processed video includes a plurality of blocks and each block includes a plurality of sub-blocks. A current block of the plurality of blocks includes vertical edges and horizontal edges. The processed video further includes a set of control parameters and reconstructed pixels corresponding to the current block. A boundary strength index is estimated at the vertical edges and at the horizontal edges of the current block. The set of control parameters, the reconstructed pixels corresponding to the current block and partially filtered pixels corresponding to a set of adjacent sub-blocks are loaded. The vertical edges and the horizontal edges of the current block are filtered based on the boundary strength index and the set of control parameters such that a vertical edge of the current block is filtered before filtering at least one horizontal edge of the current block.

16 Claims, 7 Drawing Sheets

Related U.S. Application Data continuation of application No. 14/282,211, filed on May 20, 2014, now Pat. No. 9,854,252.

(60) Provisional application No. 61/825,277, filed on May 20, 2013.

(51) Int. Cl.
*H04N 19/117* (2014.01)
*H04N 19/186* (2014.01)

(56) References Cited

U.S. PATENT DOCUMENTS

| | | | |
|---|---|---|---|
| 2010/0220931 A1* | 9/2010 | Zhou | H04N 19/14 375/E7.076 |
| 2011/0116545 A1 | 5/2011 | Zan | |
| 2011/0200103 A1* | 8/2011 | Kim | H04N 19/117 375/240.03 |
| 2012/0294353 A1 | 11/2012 | Fu et al. | |
| 2013/0034169 A1 | 2/2013 | Sadafale et al. | |
| 2013/0058412 A1 | 3/2013 | Chen et al. | |
| 2013/0215976 A1* | 8/2013 | Kim | H04N 19/14 375/E7.193 |
| 2016/0191944 A1 | 6/2016 | Oh | |

* cited by examiner

METHOD AND APPARATUS OF HEVC DE-BLOCKING FILTER

CROSS REFERENCES TO RELATED APPLICATIONS

This application is a continuation of U.S. patent application Ser. No. 16/564,871, filed Sep. 9, 2019, which a continuation of U.S. patent application Ser. No. 15/853,474, filed Dec. 22, 2017, (now U.S. Pat. No. 10,455,238) which is a continuation of U.S. patent application Ser. No. 14/282,211, filed May 20, 2014 (now U.S. Pat. No. 9,854,252), which claims priority from U.S. Provisional Patent Application No. 61/825,277, filed on May 20, 2013, the contents of all are incorporated herein by reference in their entirety.

TECHNICAL FIELD

Embodiments of the disclosure relate generally to video coding and more particularly to a de-blocking filter used for removing blocking artifacts that occur in video coding standards such as H.264 and H.265.

BACKGROUND

High Efficiency Video Coding (HEVC) is a new video coding standard being developed jointly by ITU-T, also known as the Video Coding Experts Group (VCEG), and by ISO/IEC, also known as the Moving Picture Experts Group (MPEG) in the joint collaborative team on video coding (JCT-VC).

A video input signal has multiple frames. HEVC divides a frame into rectangular blocks or LCU (largest coding units) or macro-blocks of 16×16, 32×32 or 64×64. An optimal size of the LCU is selected based on the video content. The rectangular blocks can be predicted from previously decoded data either by motion compensated prediction or intra prediction. The resulting prediction error is coded by applying block transforms based on an integer approximation of the discrete cosine transform which is followed by the quantization and coding of the transform coefficients. In this coding scheme, discontinuities can occur in the reconstructed video signal at the block boundaries which are known as blocking artifacts. The blocking artifacts can, for instance, arise due to different intra predictions of the blocks, quantization effects and motion compensation. De-blocking filters are used in the video coding standards in order to combat blocking artifacts. De-blocking filtering is one of the most computation intensive blocks in HEVC and increases the video decoder/encoder complexity. Therefore, improved de-blocking filters are required to achieve bit rate reduction in HEVC

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a de-blocking filter in a video processing apparatus. The de-blocking filter includes a boundary strength block that receives a set of control parameters associated with a processed video and estimates a boundary strength index at vertical edges and at horizontal edges of a current block of a plurality of blocks. The processed video includes the plurality of blocks and each block comprises a plurality of sub-blocks. A reconstructed memory is coupled to the boundary strength block and receives the processed video. The reconstructed memory stores reconstructed pixels corresponding to the current block received in the processed video. A de-block controller is coupled to the boundary strength block and the reconstructed memory. A work memory is coupled to the de-block controller and stores partially filtered pixels corresponding to a set of adjacent sub-blocks. The de-block controller loads the set of control parameters, the boundary strength index at the vertical edges and the horizontal edges of the current block and the reconstructed pixels corresponding to the current block in the work memory. A de-blocking filter engine includes a plurality of core engines. The de-blocking filter engine filters the vertical edges and the horizontal edges of the current block based on the boundary strength index and the set of control parameters such that a vertical edge of the current block is filtered before filtering at least one horizontal edge of the current block.

Another embodiment provides a method of de-blocking filtering a processed video. The processed video includes a plurality of blocks and each block includes a plurality of sub-blocks. A current block of the plurality of blocks includes vertical edges and horizontal edges. The processed video further includes a set of control parameters and reconstructed pixels corresponding to the current block. A boundary strength index is estimated at the vertical edges and at the horizontal edges of the current block. The set of control parameters, the reconstructed pixels corresponding to the current block and partially filtered pixels corresponding to a set of adjacent sub-blocks are loaded. The vertical edges and the horizontal edges of the current block are filtered based on the boundary strength index and the set of control parameters such that a vertical edge of the current block is filtered before filtering at least one horizontal edge of the current block.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
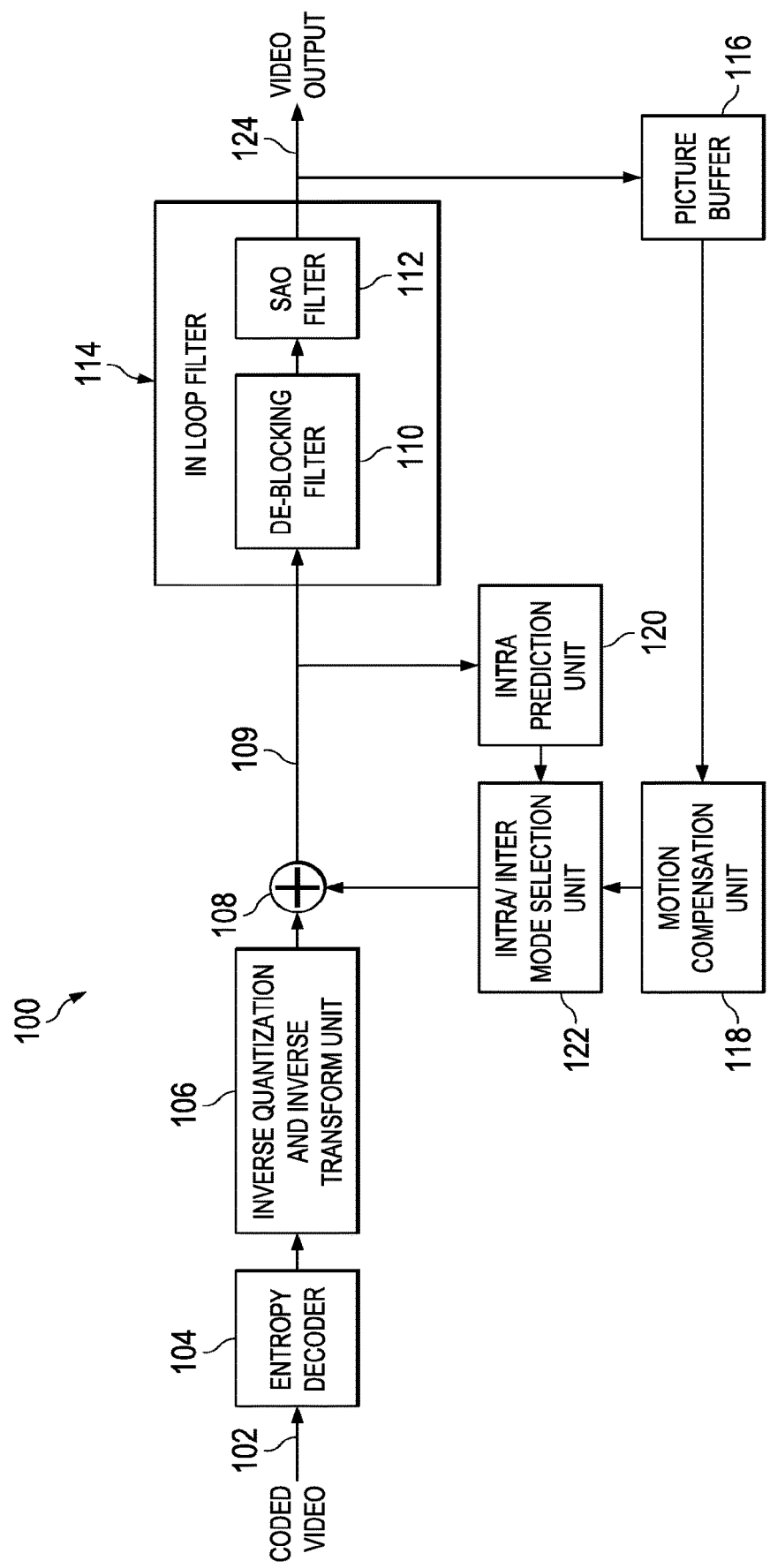
FIG. 1 illustrates a block diagram of a video decoder, according to an example embodiment.

FIG. 1 illustrates a block diagram of a video decoder 100, according to an example embodiment. The video decoder 100 receives a coded video 102. An entropy decoder 104 receives the coded video 102. An inverse quantization and inverse transform unit 106 is coupled to the entropy decoder 104. The inverse quantization and inverse transform unit 106 is coupled to an adder 108. An output of the adder 108 is a processed video 109 that is provided to the in-loop filter 114 and an intra prediction unit 120. The in-loop filter 114 includes a de-blocking filter 110 coupled to a SAO (sample adaptive offset) filter 112. The in-loop filter 114 generates a video output 124. A picture buffer 116 receives the video output 124 from the in-loop filter 114. A motion compensation unit 118 is coupled to the picture buffer 116. An intra/inter mode selection unit 122 is coupled to the intra prediction unit 120 and the motion compensation unit 118. The adder 108 receives an output of the intra/inter mode selection unit 122. In one example embodiment, the entropy decoder 104 is coupled to the intra prediction unit 120 and the motion compensation unit 118.

The operation of the video decoder 100 illustrated in FIG. 1 is explained now. The entropy decoder 104 performs a lossless decoding of the coded video 102 and extracts type of macro-block information, intra prediction mode, texture data, motion information and other information. The entropy decoder 104 forwards the texture data to the inverse quantization and inverse transform unit 106. The entropy decoder 104 forwards the intra prediction mode and motion information to the intra prediction unit 120 and motion compensation unit 118 respectively. The inverse quantization and inverse transform unit 106 inversely quantizes the decoded video provided by the entropy decoder 104 and performs inverse transform on the result of inverse quantization. As an example, if DCT (discrete cosine transform) is performed in a video encoder, an inverse DCT is performed in the video decoder 100. The intra prediction unit 120 generates a predicted block for a current block from an adjacent block outputted from the adder 108. The intra prediction unit 120 provides the generated predicted block to the intra/inter mode selection unit 122. The motion compensation unit 118 performs motion compensation on the motion information received from the entropy decoder 104. In one embodiment, the motion compensation unit 118 performs motion compensation on a video output 124 received from the picture buffer 116. The output of the motion compensation unit 118 is provided to the intra/inter mode selection unit 122. The intra/inter mode selection unit 122 selects one output among the outputs received from the intra prediction unit 120 or the output received from the motion compensation unit 118. The output selected by the intra/inter mode selection unit 122 is provided to the adder 108. The intra/inter mode selection unit 122 selects the output based on a decoding of prediction type of a present block provided to the adder 108 by the entropy decoder 104.

The adder 108 adds the output from the inverse quantization and inverse transform unit 106 and the output from the intra/inter mode selection unit 122 to generate the processed video 109. The processed video 109 includes a plurality of LCUs (largest coding units) and each LCU of the plurality of LCUs comprises the plurality of blocks. Each block includes a plurality of sub-blocks. The processed video further includes a set of control parameters and reconstructed pixels. The processed video from the adder 108 is received by the de-blocking filter 110 to perform filtering. The de-blocking filter 110 is used to remove blocking artifacts arising due to different intra predictions of the blocks, quantization effects and motion compensation. The de-blocking filter 110 eliminates a difference in level at multiple edges between adjacent blocks. The processing amount of the de-blocking filtering by the de-blocking filter 110 is enormous and may occupy 50% of the total processing amount of the video decoder 100. The output of the de-blocking filter 110 is provided to the SAO filter 112. SAO filter 112 involves adding an offset to compensate for intensity shift directly to an output of the de-blocking filter 110. The value of the offset depends on the local characteristics surrounding the pixel, i.e., edge direction/shape and/or pixel intensity level. The output of the SAO filter 112 is the output frames which are provided as video output 124. The video output 124 is provided to the picture buffer 116 which is used to temporarily store the video output 124 before passing the video output 124 to the motion compensation unit 118. All the blocks in the video decoder 100 such as entropy decoder 104, inverse quantization and inverse transform unit 106, motion compensation unit 118 including the in-loop filter 114 operate at LCU level i.e. the processing of an incoming signal in all the blocks of the video decoder 100 is performed at LCU level.

Figure 2:
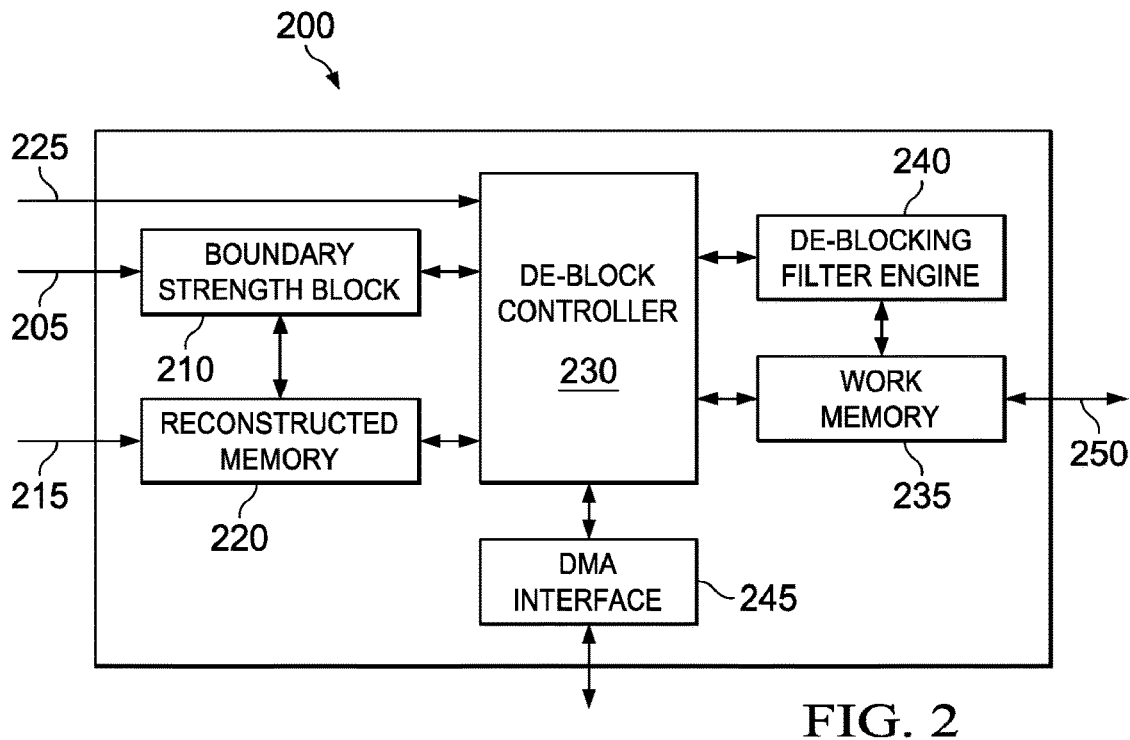
FIG. 2 illustrates a block diagram of a de-blocking filter, according to an embodiment.

FIG. 2 illustrates a block diagram of a de-blocking filter 200, according to an embodiment. The de-blocking filter 200, in an embodiment, is similar in connections to the de-blocking filter 110 of the video decoder 100, illustrated in FIG. 1. In an embodiment, the de-blocking filter 200 is part of a video processing apparatus. In one embodiment, the de-blocking filter 200 is used in any of the available video decoders or video encoders. The operation of a video encoder is inverse of the operation of a video decoder, for example video decoder 100. However, the operation of a de-blocking filter, for example de-blocking filter 200, is similar in both the video encoder and the video decoder. Therefore, the operation of the de-blocking filter 200 explained below in this description is applicable to both the video encoder and the video decoder. In an embodiment, the de-blocking filter 200 is part of a video processing apparatus of a computing device. The de-blocking filter 200 receives a processed video similar to the processed video 109. The processed video includes a plurality of frames. Each frame of the plurality of frames includes a plurality of LCUs (largest coding units) or macro-blocks. Each LCU of the plurality of LCU includes a plurality of blocks. Each block of the plurality of blocks includes a plurality of sub-blocks. The processed video also includes a set of control parameters and reconstructed pixels.

A boundary strength block 210 in the de-blocking filter 200 receives the set of control parameters 205 associated the processed video. In an embodiment, the boundary strength block 210 receives a set of control parameters associated with each LCU in the processed video. The set of control parameters 205 include the following, but not limited to, motion vectors, prediction details, intra modes, inter modes and skip modes. A reconstructed memory 220 is coupled to the boundary strength block 210. The reconstructed memory 220 receives the reconstructed pixels 215 from the processed video. In an embodiment, the reconstructed memory 220 also receives a set of parameters associated with reconstructed pixels in the corresponding LCUs. The set of parameters include the following, but not limited to block and sub-block boundary related information. In an embodiment, these parameters (block and sub-block boundary related information) are received in the boundary strength block 210 as part of control parameters 205. A de-block controller 230 is coupled to the boundary strength block 210 and the reconstructed memory 220. Also, the de-block controller 230 receives a set of parameters 225 associated with each frame of the plurality of frames in the processed video. The set of parameters 225 include the following, but not limited to frame width, frame height and in-loop filtering across block/sub-block boundaries. In an embodiment, the set of parameters 225 are received by the boundary strength block 210 as part of the control parameters 205. Therefore, the set of parameters 225, the set of control parameters 205 and the reconstructed pixels 215 together form the processed video. In an embodiment, the set of control parameters 205 include the following, but not limited to motion vectors, prediction details, intra modes, inter modes, skip modes, block and sub-block boundary related information, frame width, frame height and in-loop filtering across block/sub-block boundaries. A work memory 235 and a DMA interface 245 are coupled to the de-block controller 230. A de-blocking filter engine 240 is coupled to the de-block controller 230 and the work memory 235. The de-blocking filter 200 may include one or more additional components known to those skilled in the relevant art and are not discussed here for simplicity of the description.

The operation of the de-blocking filter 200 illustrated in FIG. 2 is explained now. The processed video includes a plurality of frames. Each frame of the plurality of frames includes a plurality of LCUs (largest coding units) or macro-blocks. Each LCU includes a plurality of blocks and each block includes a plurality of sub-blocks. Each block has vertical edges and horizontal edges. A current block is a block of the plurality of blocks that is to be processed in the de-blocking filter engine 240. The boundary strength block 210 receives the set of control parameters 205 associated with the processed video. The boundary strength block 210 estimates a boundary strength index at the vertical edges and the horizontal edges of the current block. In one embodiment, the boundary strength index is at least one of 0, 1, and 2. In an embodiment, the de-blocking filter 200 performs a logic operation in a logic unit external to the de-blocking filter 200 to determine if the boundary strength index is equal to 1 and performs a logic operation in the boundary strength block 210 if the boundary strength index is not equal to 1. When the boundary strength index is not equal to 1, the boundary strength block 210 estimates if the boundary strength index is 0, 2. In an embodiment, the de-blocking filter 200 performs a logic operation in the boundary strength block 210 to determine if the boundary strength index is equal to 1. The reconstructed memory 220 receives the reconstructed pixels 215. The reconstructed memory 220 stores the reconstructed pixels 215 corresponding to the current block. In an embodiment, the reconstructed memory 220 provides the reconstructed pixels 215 to the boundary strength block 210.

The work memory 235 stores partially filtered pixels corresponding to a set of adjacent sub-blocks. The set of adjacent blocks includes a set of left sub-blocks, a set of top sub-blocks and a set of top-left sub-blocks. The set of left sub-blocks, the set of top sub-blocks and the set of top-left sub-blocks are sub-blocks of blocks adjacent to the current block. The de-block controller 230 loads the set of control parameters 205 and the boundary strength index at each edge of the current block from the boundary strength block 210 in the work memory 235. The de-block controller 230 also loads the reconstructed pixels 215 corresponding to the current block from the reconstructed memory 220 in the work memory 235. The current block has a plurality of sub-blocks. In an embodiment, the de-block controller 230 loads reconstructed pixels 215 corresponding to each sub-block in the current block from the reconstructed memory 220 into the work memory 235. In an embodiment, the reconstructed pixels 215 are loaded from the reconstructed memory 220 into the work memory 235 in an order as per the requirement of filter operation. In an embodiment, the de-block controller 230 includes a plurality of slave controllers and a master controller. Each slave controller of the plurality of slave controllers is assigned a task such as the following, but not limited to, loading the set of control parameters 205 in the work memory 235, loading boundary strength index at each edge of the current block from the boundary strength block 210 in the work memory 235 and loading the reconstructed pixels 215 corresponding to the current block from the reconstructed memory 220 in the work memory 235. The master controller is configured to perform scheduling of tasks on the plurality of slave controllers.

The de-block controller 230 is configured to load from the work memory, the set of control parameters 205, the boundary strength index at the vertical edges and the horizontal edges of the current block, the reconstructed pixels 215 corresponding to the current block and the partially filtered pixels corresponding to a set of adjacent sub-blocks, in the de-blocking filter engine 240. The de-blocking filter engine 240 includes a plurality of core engines. The de-blocking filter engine 240 filters the vertical edges and the horizontal edges of the current block based on the boundary strength index and the set of control parameters 205. The de-blocking filter engine 240 filters a vertical edge of the current block before filtering at least one horizontal edge of the current block. In an embodiment, the de-blocking filter engine 240 filters all the vertical edges of the current block before filtering all the horizontal edges of the current block. The filtering by the de-blocking filter engine 240 includes performing at least one of strong filtering, weak filtering and bypass filtering. This step is defined as pre-filtering in which the de-blocking filter engine 240 analyzes an edge along with the boundary strength index and the set of control parameters 205 to determine if strong filtering, weak filtering or bypass filtering is required to be performed at the edge.

Each LCU includes a plurality of blocks. The de-blocking filter engine 240 filters the vertical edge of the current block before filtering at least one horizontal edge of the current block followed by filtering a vertical edge of a subsequent block before filtering at least one horizontal edge of the subsequent block. For example, an LCU includes a first block and a second block, the de-blocking filter engine 240 filters a vertical edge of the first block before filtering at least one horizontal edge of the first block. Thereafter, the de-blocking filter engine 240 filters a vertical edge of the second block before filtering at least one horizontal edge of the second block. Each LCU has a plurality of blocks arranged in rows and columns. Each LCU has a plurality of rows and a plurality of columns. The plurality of blocks is arranged in the plurality of columns. The de-blocking filter engine 240 filters all blocks in a column before filtering all blocks in a subsequent column. For example, when an LCU has a first column and a second column, the de-blocking filter engine 240 filters all the blocks in the first column before filtering all the blocks in the second column.

Each block including the current block includes pixels. In an embodiment, each block includes N×N pixels. An edge of the block has at least one of N/2 pixels and N/4 pixels. In an embodiment, when a block is of 16×16 pixels, an edge of the block is defined to be of 4 pixels (N/4 pixels). In another embodiment, when a block is of 8×8 pixels, an edge of the block is defined to be of 4 pixels (N/2 pixels). In an embodiment, when a block is of 32×32 pixels, an edge of the block is defined to be of 4 pixels (N/8 pixels).

The de-block controller 230, in an embodiment, forms a processing block from the set of adjacent sub-blocks and the current block. The work memory 235 stores partially filtered pixels corresponding to the set of adjacent sub-blocks. The de-block controller 230 also loads the reconstructed pixels 215 corresponding to the current block from the reconstructed memory 220 in the work memory 235. The de-block controller 230 form the processing block from the partially filtered pixels corresponding to the set of adjacent sub-blocks and from the reconstructed pixels 215 corresponding to the current block. The de-block controller 230 provides the processing block to the de-blocking filter engine 240. The de-block controller 230 also provides the following information to the de-blocking filter engine 240, but not limited to, the set of control parameters 205 and the boundary strength index at each edge of the current block. The de-block controller 230 also provides the boundary strength index associated with each edge of the set of adjacent sub-blocks to the de-blocking filter engine 240. The de-blocking filter engine 240 filters edges of a set of sub-blocks in the processing block. The de-blocking filter engine 240 does not filter edges of remaining sub-blocks in the processing block. The de-block controller 230 stores the remaining sub-blocks in the work memory 235. The remaining sub-blocks includes sub-blocks in a last column and a last row of the processing block. The pixels corresponding to the remaining sub-blocks are the partially filtered pixels and pixels corresponding to the filtered sub-blocks are the fully reconstructed pixels. The fully reconstructed pixels and the partially filtered pixels are stored in the work memory 235. In an embodiment, the de-block controller 230 is configured to store the partially filtered pixels obtained after filtering in the work memory 235.

In an embodiment, the current block includes a top-left vertical edge, a bottom-left vertical edge, a top-right vertical edge, a bottom-right vertical edge, a top-first horizontal edge, a top-second horizontal edge, a bottom-first horizontal edge, a bottom-second horizontal edge. The boundary strength block 210 estimates the boundary strength index at each edge of the current block. The de-blocking filter engine 240 filters the top-left vertical edge, the bottom-left vertical edge followed by filtering an edge between a left sub-block and a left top sub-block and the top-first horizontal edge. The left sub-block is a sub-block in the set of left sub-blocks and the left top sub-block is a sub-block in the set of left top sub-blocks. In an embodiment, when the de-blocking filter engine 240 includes a plurality of core engines, each core engine filters in parallel pixel edges between adjacent sub-blocks. For example, when the de-blocking filter engine 240 has four core engines and each block is of 8×8 pixels, an edge of the block has 4 pixels. The sub-block is of 4×4 pixels. There are 4 pixel edges between two adjacent sub-blocks and each pixel edge has 4 pixels on the left or top and 4 pixels on the right or bottom. Thus, each core engine will filter a pixel edge between two adjacent sub-blocks and four core engines in parallel will filter the 4 pixel edges between two adjacent sub-blocks. Hence, in one filtering operation an edge such as the top-left vertical edge of the current block will get filtered. In an embodiment, when a core engine during filtering of a pixel edge uses the 4 pixels on the left and the 4 pixels on the right for filtering, the de-blocking filter engine 240 is performing strong filtering. When the core engine during filtering of a pixel edge uses less than 4 pixels on the left and less than 4 pixels on the right for filtering, the de-blocking filter engine 240 is performing weak filtering. In an embodiment, when the boundary strength index of an edge is 0, the de-blocking filter engine 240 performs bypass filtering on the edge i.e. no filtering is performed on the edge with the boundary strength index equal to 0. The concept is also explained later in the description with the help of examples.

The de-blocking filter 200 further includes a DMA interface 245 coupled to the de-block controller 230. The de-block controller 230 use the DMA interface 245 for storing a data in one of an on-chip memory and an external DDR (double data rate) memory when the data stored in the work memory 235 is above a threshold. The data in the work memory 235 includes partially filtered pixels corresponding to the set of adjacent sub-blocks, the set of control parameters 205 and the reconstructed pixels 215 corresponding to the current block. In an embodiment, the de-blocking filter 200 sequentially process luma and chroma (Cb and Cr) components of the processed video. In an embodiment, the de-blocking filter 200 includes dedicated de-blocking filter engines and work memory for luma and chroma (Cb and Cr) components of the processed video. In an embodiment, dedicated de-blocking filters are used for filtering the luma and chroma (Cb and Cr) components respectively of the processed video. The operation of the de-blocking filter 200 is now further illustrated with the help of an example illustrated in FIG. 3(a)-FIG. 3(f).

Figure 3A:
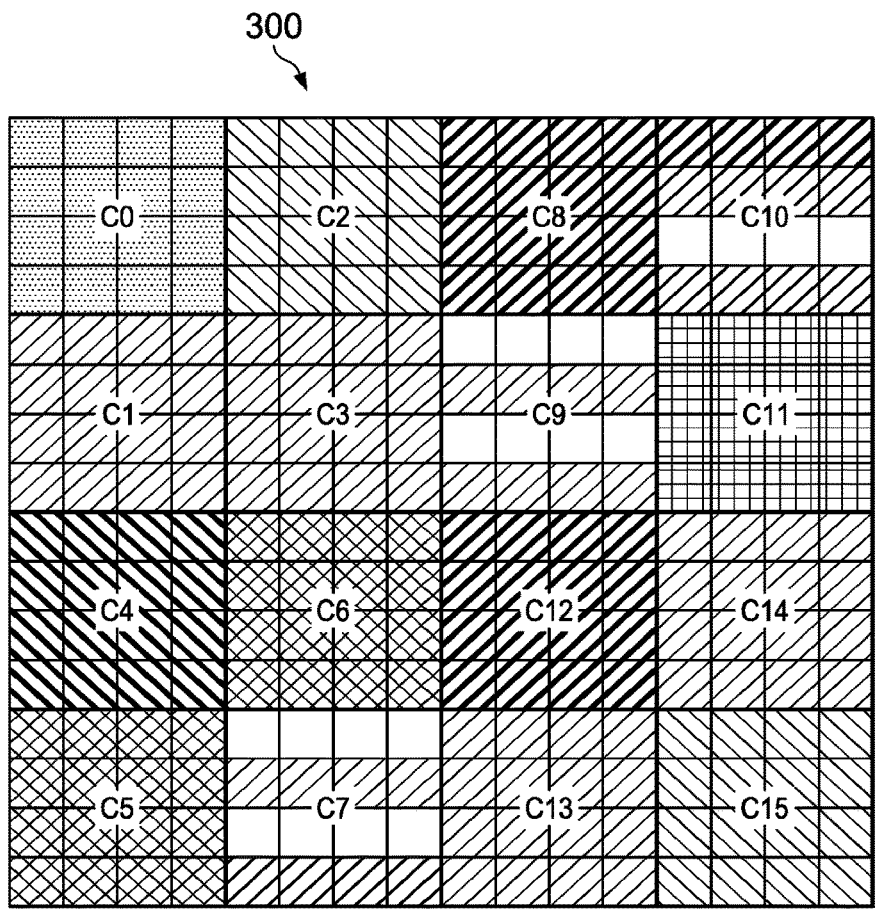
FIG. 3(a) illustrates a largest coding unit (LCU) to be processed in a de-blocking filter, according to an embodiment.

FIG. 3(a) illustrates a largest coding unit (LCU) 300 to be processed in a de-blocking filter, according to an embodiment. The LCU 300 is contained in a processed video. The LCU 300, as illustrated in FIG. 3(a) is a 16×16 LCU i.e. 16 pixels in each row and 16 pixels in each column. The LCU 300 is used to explain the logical flow according to an embodiment and is understood not to limit the scope of the present disclosure. The LCU 300 contains 4 blocks. A first block is a combination of C0, C1, C2 and C3. A second block is a combination of C4, C5, C6, and C7. A third block is a combination of C8, C9, C10 and C11. A fourth block is a combination of C12, C13, C14 and C15. Each of C0, C1, C2, C3, C4, C5, C6, C7, C8, C9, C10, C11, C12, C13, C14 and C15 represents sub-blocks in the LCU 300. Each sub-block is of 4×4 pixels. For example, sub-block C0 has 4×4 pixels. The first block which is a combination of sub-blocks C0, C1, C2 and C3 is of 8×8 pixels. An edge of the first block is defined as 4 pixels. Therefore, every block has two edges on each side. This is further explained with the help of FIG. 3(b).

Figure 3B:
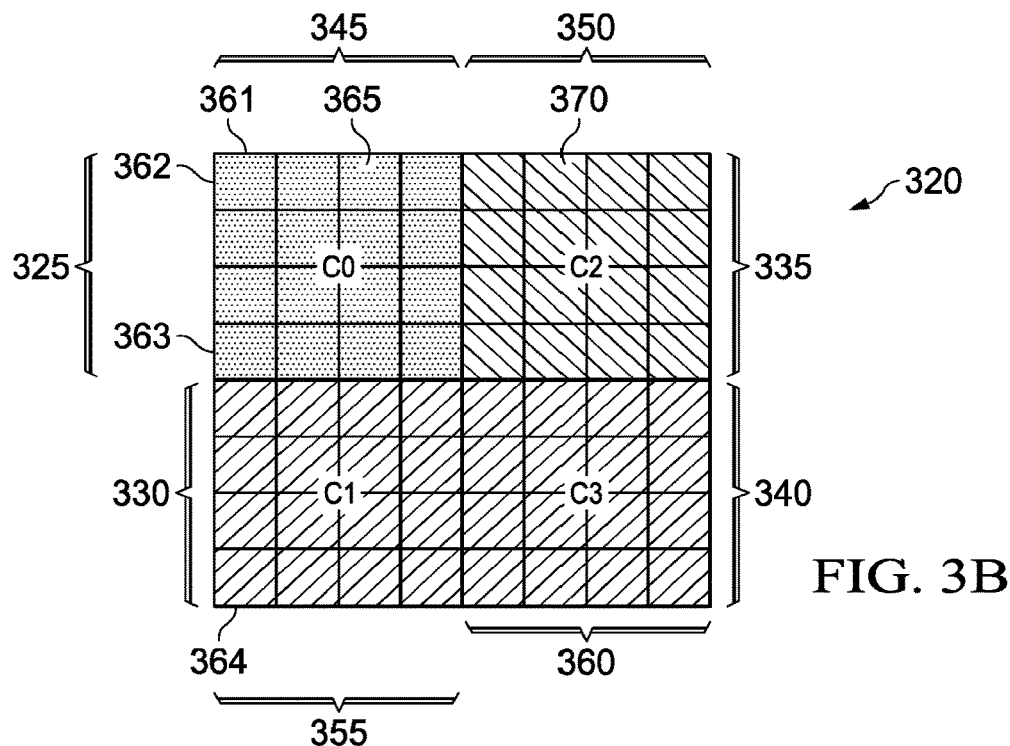
FIG. 3(b) illustrates a current block to be processed in a de-blocking filter, according to an embodiment.

FIG. 3(b) illustrates a current block 320 to be processed in a de-blocking filter, according to an embodiment. The current block 320 is a combination of sub-blocks C0, C1, C2 and C3 (also illustrated in FIG. 3(a)). The current block 320 is of 8×8 pixels and each edge of the current block is of 4 pixels. The current block 320 is similar to the first block illustrated in FIG. 3(a). The current block 320 includes a top-left vertical edge 325, a bottom-left vertical edge 330, a top-right vertical edge 335, a bottom-right vertical edge 340, a top-first horizontal edge 345, a top-second horizontal edge 350, a bottom-first horizontal edge 355 and a bottom-second horizontal edge 360. Each sub-block is of 4×4 pixels. For example, sub-block C0 has 4×4 pixels. Thus, each sub-block has a total of 16 pixels. The processing of the current block 320 and the LCU 300 is now explained with the help of de-blocking filter 200. The boundary strength block 210 in the de-blocking filter 200 receives a set of control parameters 205 associated with the LCU 300. The reconstructed memory 220 receives reconstructed pixels 215. The processed video received in the de-blocking filter 200 includes a plurality of frames. Each frame of the plurality of frames includes a plurality of LCUs (largest coding units) or macroblocks and LCU 300 is one LCU of the plurality of LCUs. The boundary strength block 210 estimates a boundary strength index at vertical edges and horizontal edges of the current block 320. The vertical edges of the current block 320 include the top-left vertical edge 325, the bottom-left vertical edge 330, the top-right vertical edge 335 and the bottom-right vertical edge 340. The horizontal edges of the current block 320 include the top-first horizontal edge 345, the top-second horizontal edge 350, the bottom-first horizontal edge 355 and the bottom-second horizontal edge 360. The reconstructed memory 220 receives and stores the reconstructed pixels 215 corresponding to the current block 320. 365 and 370 represents reconstructed pixels in sub-blocks C0 and C2 respectively. Also, 361, 362, 363 and 364 represents pixel edges.

Figure 3C:
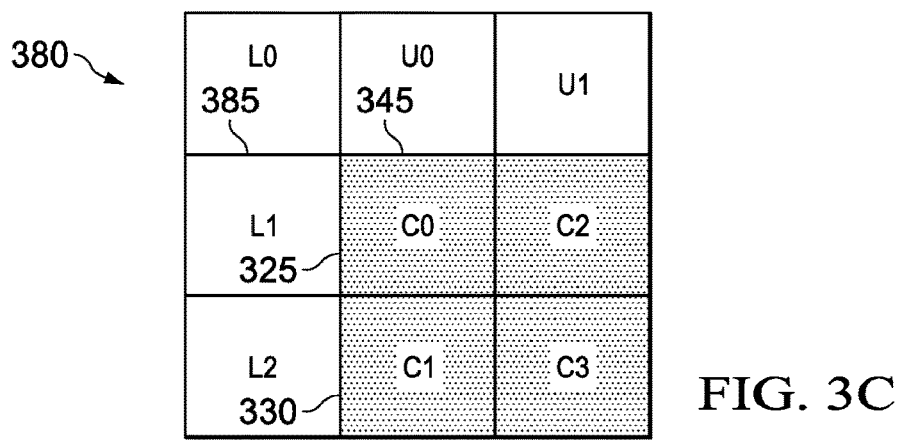
FIG. 3(c) illustrates a processing block to be processed in a de-blocking filter, according to an embodiment.

FIG. 3(c) illustrates a processing block 380 to be processed in a de-blocking filter, according to an embodiment. The processing block 380 is formed by the de-block controller 230 from a set of adjacent sub-blocks and the current block 320. The current block 320 includes sub-blocks C0, C1, C2 and C3. The set of adjacent blocks includes a set of left sub-blocks, a set of top sub-blocks and a set of top-left sub-blocks. The set of left sub-blocks, the set of top sub-blocks and the set of top-left sub-blocks are sub-blocks of blocks adjacent to the current block. The set of left sub-blocks includes sub-blocks L1 and L2. The set of top sub-blocks includes U0 and U1. The set of top-left sub-blocks include sub-block L0. It is understood that the set of sub-blocks illustrated in FIG. 3(c) are exemplary, and the processing block 380 can include a plurality of left sub-blocks, a plurality of top sub-blocks and a plurality of top-left sub-blocks. The work memory 235 stores partially filtered pixels corresponding to the set of adjacent sub-blocks. The de-block controller 230 loads the set of control parameters 205 and the boundary strength index at each edge of the current block 320 from the boundary strength block 210 in the work memory 235. The de-block controller 230 also loads the reconstructed pixels 215 corresponding to the current block 320 from the reconstructed memory 220 in the work memory 235. In an embodiment, the de-block controller 230 loads reconstructed pixels corresponding to each sub-block C0, C1, C2 and C3 from the reconstructed memory 220 into the work memory 235.

The de-block controller 230 form the processing block 380 from the partially filtered pixels corresponding to the set of adjacent sub-blocks (L0, L1, L2, U0 and U1) and from the reconstructed pixels corresponding to the current block 320. The de-block controller 230 provides the processing block 380 to the de-blocking filter engine 240. The de-block controller 230 also provides the following information to the de-blocking filter engine 240, but not limited to, the set of control parameters 205 and the boundary strength index at each edge of the current block 320. The de-block controller 230 also provides the boundary strength index associated with each edge of the set of adjacent sub-blocks to the de-blocking filter engine 240. The de-blocking filter engine 240 filters edges of a set of sub-blocks in the processing block 380. The de-blocking filter engine 240 filters the top-left vertical edge 325 and the bottom-left vertical edge 330 followed by filtering an edge 385 between the left sub-block L1 and the top-left sub-block L0 and the top-first horizontal edge 345. In an embodiment, when the de-blocking filter engine 240 includes a plurality of core engines, each core engine filters in parallel pixel edges between adjacent sub-blocks. For example, when the de-blocking filter engine 240 has four core engines. Each sub-block is of 4×4 pixels. Thus, the adjacent sub-blocks L1 and C0 shares 4 pixel edges and each pixel edge has 4 pixels on the left or top and 4 pixels on the right or bottom. Thus, each core engine will filter a pixel edge between the two adjacent sub-blocks L1 and C0 and the four core engines in parallel will filter the 4 pixel edges between the two adjacent sub-blocks L1 and C0. Hence, in one filtering operation an edge such as the top-left vertical edge 325 of the current block 320 will get filtered. The de-blocking filter engine 240 filters a vertical edge of the current block 320 before filtering at least one horizontal edge of the current block 320. In an embodiment, when a core engine during filtering of a pixel edge uses the 4 pixels on the left and the 4 pixels on the right for filtering, the de-blocking filter engine 240 is performing strong filtering. When the core engine during filtering of a pixel edge uses less than 4 pixels on the left and less than 4 pixels on the right for filtering, the de-blocking filter engine 240 is performing weak filtering. In an embodiment, when the boundary strength index of an edge is 0, the de-blocking filter engine 240 performs bypass filtering on the edge i.e. no filtering is performed on the edge with the boundary strength index equal to 0.

Figure 3D:
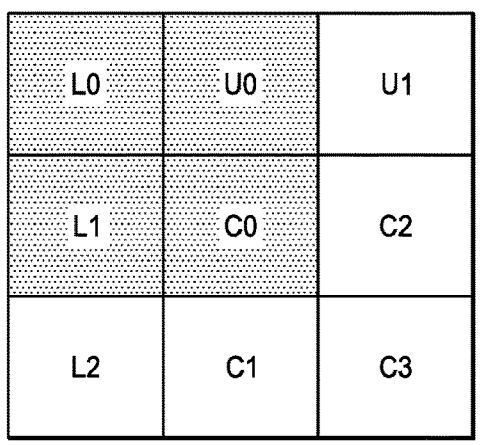
FIG. 3(d) illustrates a processing block after filtering by a de-blocking filter engine, according to an embodiment.

The de-blocking filter engine 240 does not filter edges of remaining sub-blocks in the processing block 380. The de-block controller 230 stores the remaining sub-blocks in the work memory 235. The remaining sub-blocks includes sub-blocks in a last column and a last row of the processing block 380. Thus the remaining sub-blocks are L2, C2, U1, C1 and C3. FIG. 3(d) illustrates the processing block 380 after filtering by the de-blocking filter engine 240, according to an embodiment. Sub-blocks L0, L1, U0 and C0 have been filtered by the de-blocking filter engine 240 while the remaining sub-blocks are L2, C2, U1, C1 and C3. The de-block controller 230 stores the filtered sub-blocks L0, L1, U0 and C0 and the remaining sub-blocks L2, C2, U1, C1 and C3 in the work memory 235. The de-block controller 230, in an embodiment, transfers the filtered sub-blocks L0, L1, U0 and C0 to a processing unit external to the de-blocking filter 200. In an embodiment, the processing unit is a (sample adaptive offset) filter. The remaining sub-blocks are filtered in the subsequent filtering operation. This is further illustrated with the help of FIG. 3(e).

Figure 3E:
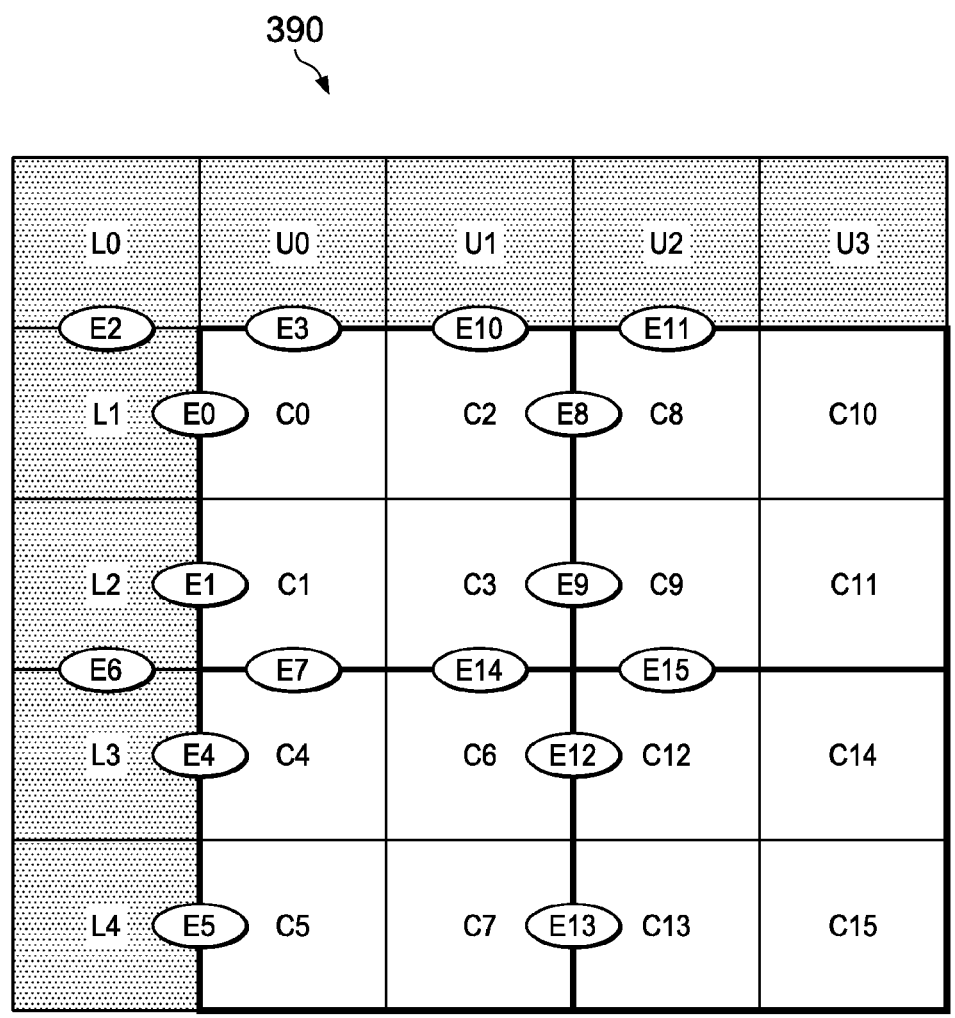
FIG. 3(e) illustrates a largest coding unit (LCU) to be processed in a de-blocking filter, according to an embodiment.

FIG. 3(e) illustrates a largest coding unit (LCU) 390 to be processed in a de-blocking filter, according to an embodiment. The LCU 390 is similar to the LCU 300 and the LCU 390 is processed, in an embodiment, in the de-blocking filter 200. The LCU 390, as illustrated in FIG. 3(e) is a 16×16 LCU i.e. 16 pixels in each row and 16 pixels in each column. The LCU 390 contains 4 blocks similar to LCU 300. A first block is a combination of C0, C1, C2 and C3. A second block is a combination of C4, C5, C6, and C7. A third block is a combination of C8, C9, C10 and C11. A fourth block is a combination of C12, C13, C14 and C15. Each of C0, C1, C2, C3, C4, C5, C6, C7, C8, C9, C10, C11, C12, C13, C14 and C15 represents sub-blocks in the LCU 390. Each sub-block is of 4×4 pixels. For example, sub-block C0 has 4×4 pixels. The first block which is a combination of sub-blocks C0, C1, C2 and C3 is of 8×8 pixels. An edge of the first block is defined as 4 pixels. Therefore, every block has two edges on each side. For example the first block has edges E0 and E1 on a left vertical side and edges E3 and E10 on a top horizontal side.

A set of sub-blocks which are adjacent to the LCU 390 are L0, L1, L2, L3, L4, U0, U1, U2 and U3. L1, L2, L3 and L4 are a set of left sub-blocks. U0, U1, U2 and U3 are a set of top sub-blocks. Sub-block L0 represents a top-left sub-block. It is understood that the set of sub-blocks illustrated in FIG. 3(e) are exemplary, and the LCU 390 can include a plurality of left sub-blocks, a plurality of top sub-blocks and a plurality of top-left sub-blocks. The work memory 235 stores partially filtered pixels corresponding to the set of adjacent sub-blocks. A current block which is to be processed by the de-blocking filter engine 240 is the first block and is a combination of sub-blocks C0, C1, C2 and C3. The de-block controller 230 forms a processing block from the set of adjacent sub-blocks L0, L1, L2, U0 and U1 and the sub-blocks C0, C1, C2 and C3 in the current block. The de-blocking filter engine 240 filters edges of a set of sub-blocks in the processing block. The de-blocking filter engine 240 filters edges E0 and E1 followed by edges E2 and E3. After filtering, L0, L1, U0 and C0 are the filtered sub-blocks while the remaining sub-blocks are L2, C2, U1, C1 and C3. The de-block controller 230 stores the remaining sub-blocks L2, C2, U1, C1 and C3 in the work memory 235. The de-block controller 230, in an embodiment, transfers the filtered sub-blocks L0, L1, U0 and C0 to a processing unit external to the de-blocking filter 200. In an embodiment, the processing unit is a (sample adaptive offset) filter.

Now, the current block is the second block which is a combination of sub-blocks C4, C5, C6 and C7. The de-block controller 230 forms a processing block from the set of adjacent sub-blocks L2, L3, L4, C1 and C3 and the sub-blocks C4, C5, C6 and C7 in the current block. The de-blocking filter engine 240 filters edges of a set of sub-blocks in the processing block. The de-blocking filter engine 240 filters edges E4 and E5 followed by edges E6 and E7. After filtering L2, L3, C1 and C4 are the filtered sub-blocks while the remaining sub-blocks are L4, C5, C3, C6 and C7. The de-block controller 230 stores the remaining sub-blocks L4, C5, C3, C6 and C7 in the work memory 235. The de-block controller 230, in an embodiment, transfers the filtered sub-blocks L2, L3, C1 and C4 to a processing unit external to the de-blocking filter 200. In an embodiment, the processing unit is a (sample adaptive offset) filter.

For further processing of the LCU 390, the current block is the third block which is a combination of sub-blocks C8, C9, C10 and C11. The de-block controller 230 forms a processing block from the set of adjacent sub-blocks C2, C3, U1, U2 and U3 and the sub-blocks C8, C9, C10 and C11 in the current block. The de-blocking filter engine 240 filters edges of a set of sub-blocks in the processing block. The de-blocking filter engine 240 filters edges E8 and E9 followed by edges E10 and E11. After filtering U1, U2, C2 and C8 are the filtered sub-blocks while the remaining sub-blocks are C3, C9, C11, U3 and C10. The de-block controller 230 stores the remaining sub-blocks C3, C9, C11, U3 and C10 in the work memory 235. The de-block controller 230, in an embodiment, transfers the filtered sub-blocks U1, U2, C2 and C8 to a processing unit external to the de-blocking filter 200. In an embodiment, the processing unit is a (sample adaptive offset) filter.

Thereafter, the current block is the fourth block which is a combination of sub-blocks C12, C13, C14 and C15. The de-block controller 230 forms a processing block from the set of adjacent sub-blocks C3, C6, C7, C9 and C11 and the sub-blocks C12, C13, C14 and C15 in the current block. The de-blocking filter engine 240 filters edges of a set of sub-blocks in the processing block. The de-blocking filter engine 240 filters edges E12 and E13 followed by edges E14 and E15. After filtering C3, C9, C6 and C12 are the filtered sub-blocks while the remaining sub-blocks are C7, C13, C15, C11 and C14. The de-block controller 230 stores the remaining sub-blocks C7, C13, C15, C11 and C14 in the work memory 235. The de-block controller 230, in an embodiment, transfers the filtered sub-blocks C3, C9, C6 and C12 to a processing unit external to the de-blocking filter 200. In an embodiment, the processing unit is a (sample adaptive offset) filter.

Thus, the de-blocking filter engine 240 filters a vertical edge of the current block before filtering at least one horizontal edge of the current block. Also, the de-blocking filter engine 240 filters the vertical edge of the current block before filtering at least one horizontal edge of the current block followed by filtering a vertical edge of a subsequent block before filtering at least one horizontal edge of the subsequent block. For example, the de-blocking filter engine 240 filter edges E0 and E1 of the first block before filtering edges E3 and E2 followed by filtering edges E4 and E5 of the second block before filtering edges E7 and E6. In addition, the de-blocking filter engine 240 filters all blocks in a column before filtering all blocks in a subsequent column. For example, the de-blocking filter engine 240 filter the first block and second block in a column before filtering the third block and the fourth block in the subsequent column.

Figure 3F:
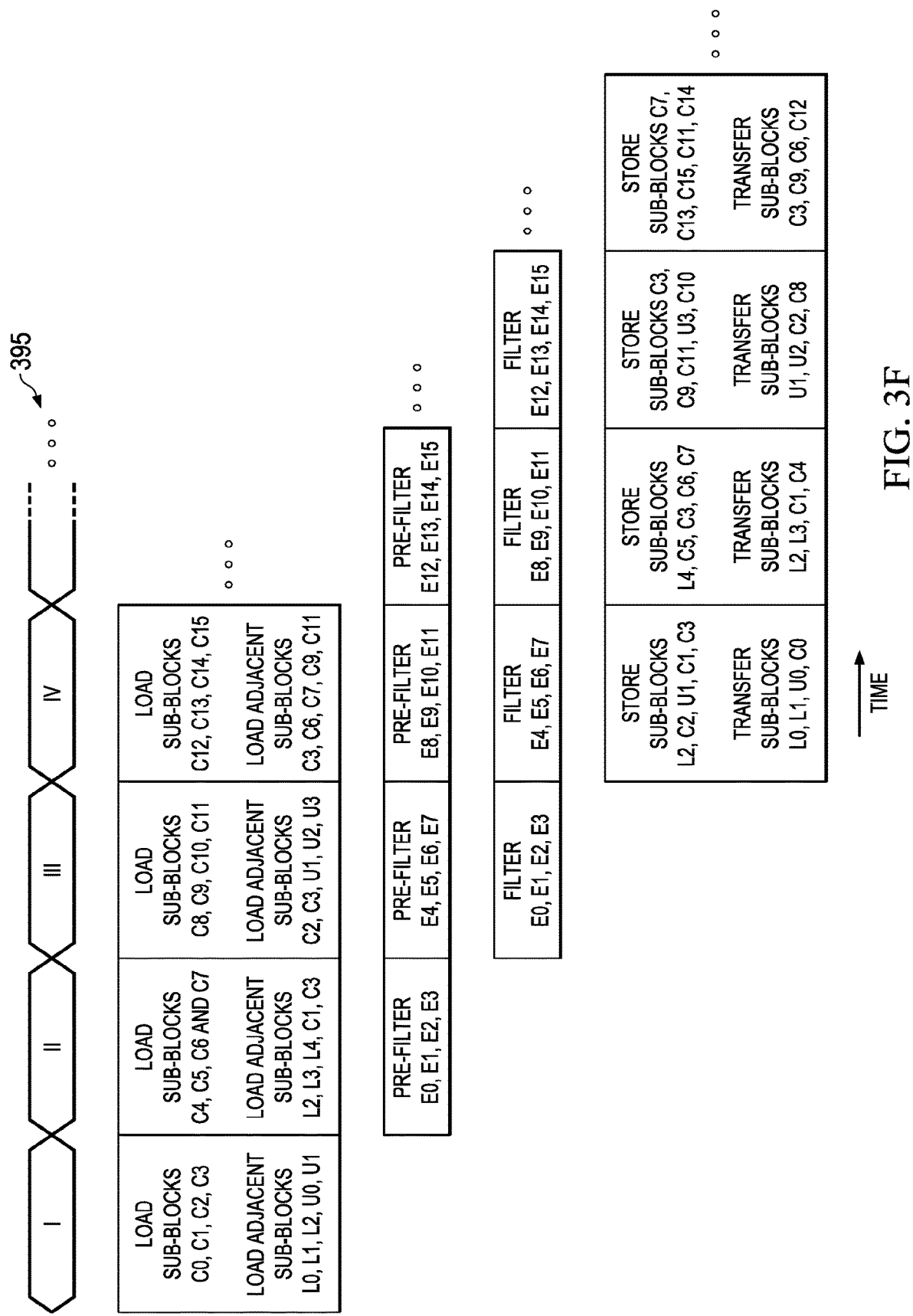
FIG. 3(f) illustrates pipeline in a de-blocking filter, according to an embodiment.

FIG. 3(f) illustrates pipeline in a de-blocking filter, according to an embodiment. The figure is explained with the help of de-blocking filter 200 (illustrated in FIG. 2) and the LCU 390 (illustrated in FIG. 3(e)). 395 represent filtering cycles in the de-blocking filter 200, according to an embodiment. In the first filtering cycle (I), the de-block controller 230 loads the adjacent sub-blocks L0, L1, L2, U0 and U1 and the sub-blocks C0, C1, C2 and C3 in the de-blocking filter engine 240. In the second filtering cycle (II), the de-block controller 230 loads the adjacent sub-blocks L2, L3, L4, C1 and C3 and the sub-blocks C4, C5, C6 and C7 in the de-blocking filter engine 240. Also, the de-blocking filter engine 240 pre-filters the edges E0, E1, E2 and E3. During pre-filtering, the de-blocking filter engine 240 determines if strong filtering, weak filtering or bypass filtering is required to be performed at the edges.

In the third filtering cycle (III), the de-block controller 230 loads the adjacent sub-blocks C2, C3, U1, U2 and U3 and the sub-blocks C8, C9, C10 and C11 in the de-blocking filter engine 240. Also, the de-blocking filter engine 240 pre-filters the edges E4, E5, E6, and E7. Also, the de-blocking filter engine 240 filters the edges E0, E1, E2 and E3. In the fourth filtering cycle (IV), the de-block controller 230 loads the adjacent sub-blocks C3, C6, C7, C9 and C11 and the sub-blocks C12, C13, C14 and C15 in the de-blocking filter engine 240. Also, the de-blocking filter engine 240 pre-filters the edges E8, E9, E10, and E11. Also, the de-blocking filter engine 240 filters the edges E4, E5, E6, and E7. During this cycle, the de-block controller 230 stores the remaining sub-blocks L2, C2, U1, C1 and C3 in the work memory 235. The de-block controller 230, in an embodiment, transfers the filtered sub-blocks L0, L1, U0 and C0 to a processing unit external to the de-blocking filter 200. In an embodiment, the processing unit is a (sample adaptive offset) filter.

In an embodiment, the de-blocking filter 200 also implements pipelining at sub-block level in which in the first filtering cycle (I), when the de-block controller 230 loads the sub-blocks C0 and L1, the de-blocking filter engine 240 pre-filters and filters the edge E0. Since to pre-filter and filter edge E0 only sub-blocks C0 and L1 are required, the steps of loading sub-blocks, pre-filtering and filtering occur concurrently in the de-blocking filter 200. This pipelining at sub-block level enhances the operating speed of the de-blocking filter 200.

Thus with the pipeline operation illustrated in FIG. 3(*f*), the de-blocking filter 200 is able to perform multiple steps in parallel and generating multiple edges in a single filtering cycle in steady state. This helps the de-blocking filter 200 to achieve bit rate reduction in video processing by reducing blocking artifacts. The given solution works at LCU level in pipeline with rest of encoding or decoding processing saving additional memory. The proposed architecture with high level parallel computations and pipelining along with block operation enables high performance. The de-blocking filter 200 helps in achieving high performance video encoder/decoder design to implement ultra-HD (4K) video playback and record.

Figure 4:
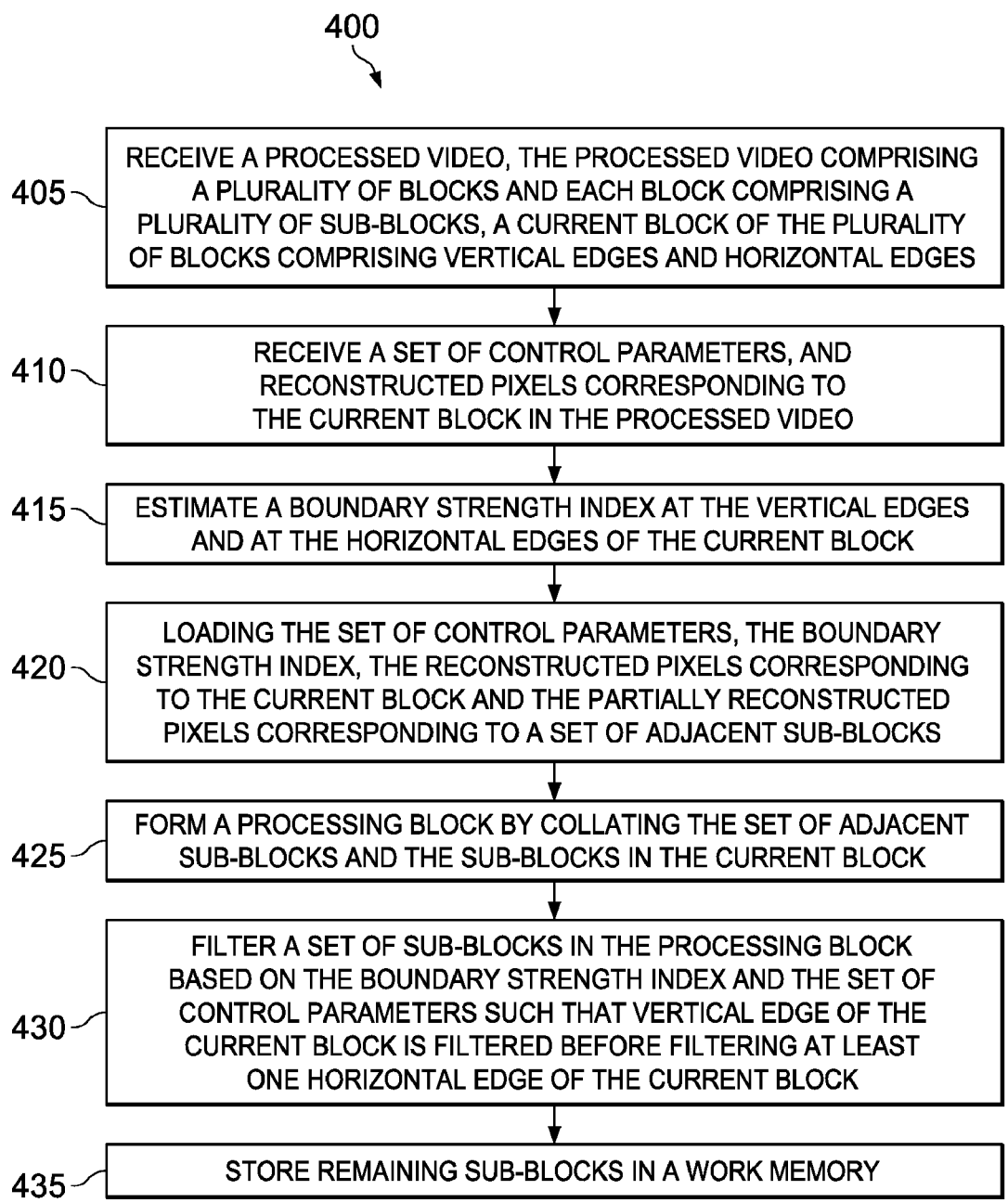
FIG. 4 illustrates a flowchart of a method of de-blocking filtering, according to an embodiment.

FIG. 4 illustrates a flowchart of a method of de-blocking filtering, according to an embodiment. At step 405, a processed video is received. The processed video includes a plurality of blocks. Each block includes a plurality of sub-blocks and a current block of the plurality of blocks includes vertical edges and horizontal edges. At step 410, a set of control parameters and reconstructed pixels corresponding to the current block are received in the processed video. In an embodiment, the set of control parameters are received in the boundary strength block 210 and the reconstructed pixels corresponding to the current block are received in the reconstructed memory 220 of the de-blocking filter 200, illustrated in FIG. 2. A boundary strength index at the vertical edges and at the horizontal edges of the current block is estimated at step 415. The boundary strength block 210, in an embodiment, estimates the boundary strength index at vertical edges and at horizontal edges of the current block. At step 420, the set of control parameters, the boundary strength index, the reconstructed pixels corresponding to the current block and the partially filtered pixels corresponding to the set of adjacent sub-blocks are loaded in the de-blocking filter engine 240. At step 425, a processing block is formed by collating the set of adjacent sub-blocks and the sub-blocks in the current block. The de-block controller 230 forms the processing block by collating the set of adjacent sub-blocks and the sub-blocks in the current block. At step 430, a set of sub-blocks in the processing block are filtered based on the boundary strength index and the set of control parameters. A vertical edge of the current block is filtered before filtering at least one horizontal edge of the current block. The de-blocking filter engine 240 does not filter edges of remaining sub-blocks in the processing block. The remaining sub-blocks includes sub-blocks in a last column and a last row of the processing block. At step 435, the de-block controller 230 stores the remaining sub-blocks in the work memory 235.

Figure 5:
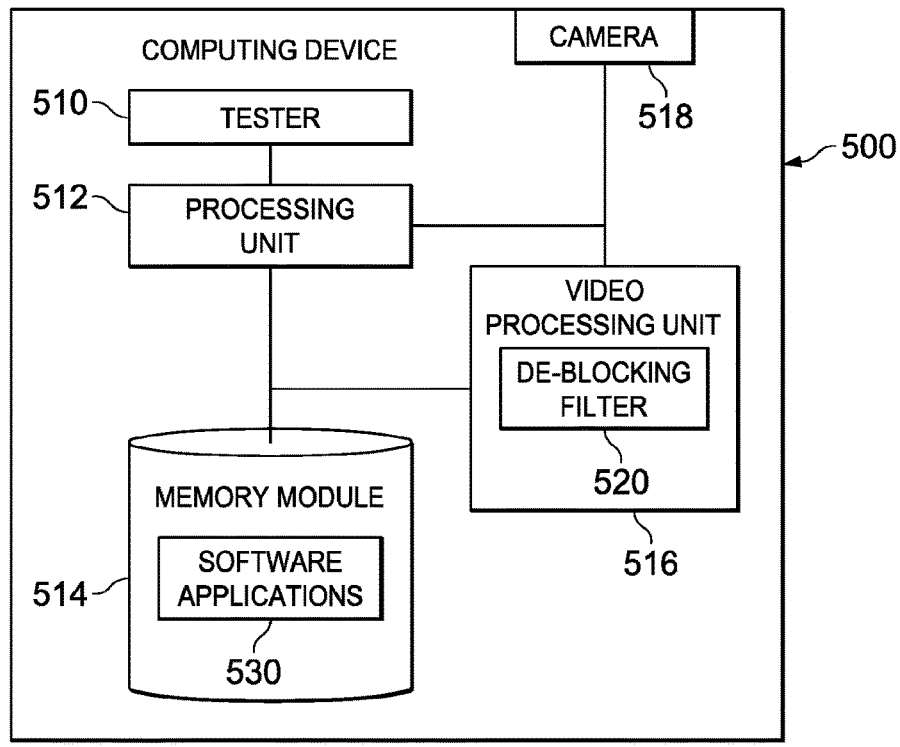
FIG. 5 illustrates a computing device, according to an embodiment.

FIG. 5 illustrates a computing device 500 according to an embodiment. The computing device 500 is, or is incorporated into, a mobile communication device, such as a mobile phone, a personal digital assistant, a transceiver, a personal computer, or any other type of electronic system. The computing device 500 may include one or more additional components known to those skilled in the relevant art and are not discussed here for simplicity of the description.

In some embodiments, the computing device 500 comprises a megacell or a system-on-chip (SoC) which includes a processing unit 512 such as a CPU (Central Processing Unit), a memory module 515 (e.g., random access memory (RAM)) and a tester 510. The processing unit 512 can be, for example, a CISC-type (Complex Instruction Set Computer) CPU, RISC-type CPU (Reduced Instruction Set Computer), or a digital signal processor (DSP). The memory module 515 (which can be memory such as RAM, flash memory, or disk storage) stores one or more software applications 530 (e.g., embedded applications) that, when executed by the processing unit 512, performs any suitable function associated with the computing device 500. The tester 510 comprises logic that supports testing and debugging of the computing device 500 executing the software applications 530. For example, the tester 510 can be used to emulate a defective or unavailable component(s) of the computing device 500 to allow verification of how the component(s), were it actually present on the computing device 500, would perform in various situations (e.g., how the component(s) would interact with the software applications 530). In this way, the software applications 530 can be debugged in an environment which resembles post-production operation.

The processing unit 512 typically comprises memory and logic which store information frequently accessed from the memory module 515. A camera 518 is coupled to the processing unit 512. The computing device 500 includes a video processing unit 516. The video processing unit 516 is coupled to the processing unit 512 and the camera 518. The video processing unit 516 includes a de-blocking filter 520. The de-blocking filter 520 is analogous to the de-blocking filter 200 in connection and operation. The image/video data shot by the camera 518 is processed in the video processing unit 516. The video data in the computing device 500 is processed using the de-blocking filter 520 as in any of the embodiments discussed previously in this description. The de-blocking filter 520 performs multiple steps in a single filtering cycle. This helps the de-blocking filter 520 to achieve bit rate reduction in video coding/decoding.

Figure 6:
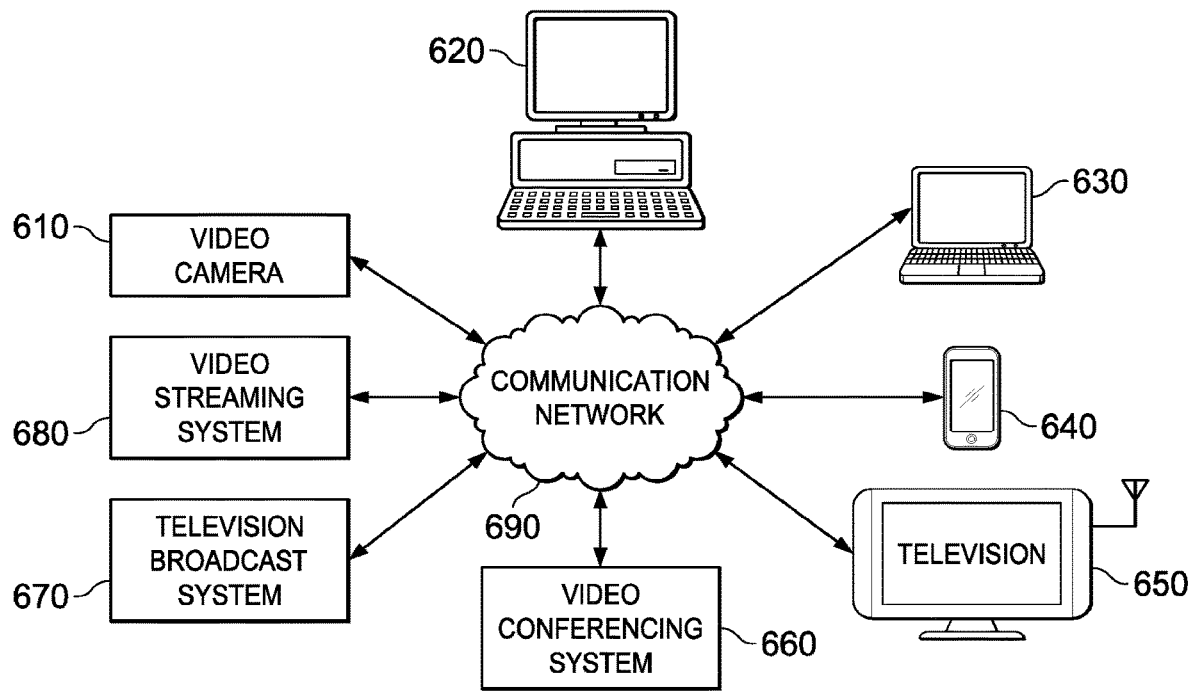
FIG. 6 is an example environment in which various aspect of the present disclosure may be implemented.

FIG. 6 is an example environment in which various aspect of the present disclosure may be implemented. As shown, the environment may comprise, for example, one or more video cameras 610, computers 620, personal digital assistants (PDA) 630, mobile devices 640, televisions 650, video conference systems 660, video streaming systems 680, TV broadcasting systems 670 and communication networks/channels 690.

The video cameras 610 are configured to take continuous pictures and generate digital video, a signal comprising sequence of image frames. The video cameras 610 are configured to process the image frames for efficient storage and/or for transmission over the communication network/channels 690. The computers 620, PDAs 630 and the mobile devices 640 are configured to encode the video signals for transmission and to decode encoded video signals received from the communication networks/channels 690. The video streaming systems 680 is configured to encode video signal and to transmit the encoded video signals over the communication networks/channels 690 responsive to a received request and/or asynchronously. The television broadcasting systems 670 are configured to process video signals in accordance with one or more broadcast technologies and to broadcast the processed video signals over the communication networks/channels 690. The video conference systems 660 are configured to receive a video signal from one or more participating/conferencing end-terminals (not shown) and to convert or compress the video signal for broadcasting or for transmitting to other participating user terminals. The television broadcasting systems 670 are configured to receive encoded video signals from one or more different broadcasting centers (or channels), to decode each video signal and to display the decoded video signals on a display device (not shown).

As shown in FIG. 6, the devices and systems 610-680 are coupled to communication networks/channels 690. Communication networks/channels 690 supports an exchange of video signal encoded in accordance with one or more video encoding standards such as, but not limited to, H. 263, H. 264/AEC, and HEVC (H. 266), for example. Accordingly, the devices and systems 610-680 are required to process (encode and/or decode) video signals complying with such standards. The systems and devices 610-680 are implemented with one or more functional units that are configured to perform signal processing, transmitting and/or receiving of video signals from communication networks/channels 690. When each device in the described environment performs video coding or decoding, one or more embodiments described in this disclosure are used.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections. The terms "inactivation" or "inactivated" or turn "OFF" or turned "OFF" is used to describe a deactivation of a device, a component or a signal. The terms "activation" or "activated" or turned "ON" describes activation of a device, a component or a signal.

It should be noted that reference throughout this specification to features, advantages, or similar language does not imply that all of the features and advantages should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

Further, the described features, advantages, and characteristics of the disclosure may be combined in any suitable manner in one or more embodiments. One skilled in the relevant art will recognize that the disclosure can be practiced without one or more of the specific features or advantages of a particular embodiment. In other instances, additional features and advantages may be recognized in certain embodiments that may not be present in all embodiments of the disclosure.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A de-blocking filter comprising:
    a boundary strength circuit configured to estimate a boundary strength index at a vertical edge and at a horizontal edge of a current block of a plurality of blocks of a video;
    a de-blocking filter coupled to the boundary strength circuit and configured to:
        filter the vertical edge based on the boundary strength index;
        filter the horizontal edge based on the boundary strength index; and
        filter a set of sub-blocks in a processing block, the processing block based on a collation of the current block and a set of sub-blocks of blocks adjacent to the current block.

2. The de-blocking filter of claim 1, wherein the de-blocking filter is configured to filter the vertical edge of the current block before filtering at least one horizontal edge of the current block followed by filtering a vertical edge of a subsequent block before filtering at least one horizontal edge of a subsequent block.

3. The de-blocking filter of claim 1, wherein:
    the video comprises a plurality of CUs (coding units) and each CU comprises the plurality of blocks arranged in a plurality of columns; and
    each block comprises N×N pixels and each edge of the block comprises at least one of N/2 pixels and N/4 pixels.

4. The de-blocking filter of claim 3, wherein the de-blocking filter is configured to filter all blocks in a column of the plurality of columns before filtering all blocks in a subsequent column in each CU.

5. The de-blocking filter of claim 1, further comprising a memory coupled to the de-blocking filter, the memory configured to store a set of left sub-blocks, a set of top sub-blocks, and a set of top-left sub-blocks, wherein the set of left sub-blocks, the set of top sub-blocks and the set of top-left sub-blocks are the sub-blocks of blocks adjacent to the current block.

6. The de-blocking filter of claim 1, further comprising a de-block controller coupled to the boundary strength circuit and the de-blocking filter, the de-block controller is configured to generate the processing block to the de-blocking filter by collating the current block and the set of sub-blocks of blocks adjacent to the current block.

7. The de-blocking filter of claim 1, wherein remaining sub-blocks comprise sub-blocks in a last column and a last row of the processing block.

8. The de-blocking filter of claim 1, wherein:
    the current block comprises a top-left vertical edge, a bottom-left vertical edge, a top-right vertical edge, a bottom-right vertical edge, a top-first horizontal edge, a top-second horizontal edge, a bottom-first horizontal edge, a bottom-second horizontal edge;
    the boundary strength circuit is configured to estimate the boundary strength index at the top-left vertical edge, the bottom-left vertical edge, the top-right vertical edge, the bottom-right vertical edge, the top-first horizontal edge, the top-second horizontal edge, the bottom-first horizontal edge, the bottom-second horizontal edge; and
    the de-blocking filter is configured to filter the top-left vertical edge and the bottom-left vertical edge followed by filtering an edge between a left sub-block and a left top sub-block and the top-first horizontal edge, wherein the left sub-block is a sub-block in the set of left sub-blocks and the left top sub-block is a sub-block in the set of left top sub-blocks.

9. The de-blocking filter of claim 1, configured to perform a logic operation based on the boundary strength index.

10. A method of filtering a video comprising:
   estimating a boundary strength index at a vertical edge and at a horizontal edge of a current block of a plurality of blocks; and
   filtering the vertical edge based on the boundary strength index and the horizontal edge of the current block based on the boundary strength index, wherein the filtering the vertical edge and the horizontal edge of the current block based on the boundary strength index comprises filtering the vertical edge before filtering the horizontal edge.

11. The method of claim 10, wherein filtering the vertical edge and the horizontal edge of the current block based on the boundary strength index comprises filtering the vertical edge of the current block before filtering at least one horizontal edge of the current block followed by filtering a set of vertical edges of a subsequent block before filtering at least one horizontal edge of the subsequent block.

12. The method of claim 11, wherein:
   the set of vertical edges comprises a top-left vertical edge, a bottom-left vertical edge, a top-right vertical edge and a bottom-right vertical edge and the at least one horizontal edge includes one of a top-first horizontal edge, a top-second horizontal edge, a bottom-first horizontal edge and a bottom-second horizontal edge.

13. The method of claim 10, wherein:
   the video comprises a plurality of CUs (coding units) and each CU comprises the plurality of blocks arranged in a plurality of columns; and
   each block comprises N×N pixels and each edge of the block comprises at least one of N/2 pixels and N/4 pixels.

14. The method of claim 13, further comprising filtering all blocks in a column of the plurality of columns before filtering all blocks in a subsequent column in each CU.

15. The method of claim 10, further comprising forming a processing block by collating a set of sub-blocks of blocks adjacent to the current block and the current block.

16. The method of claim 15, further comprising filtering a set of sub-blocks in the processing block and storing remaining sub-blocks in the processing block, remaining sub-blocks are the sub-blocks in a last column and a last row of the processing block.

* * * * *